United States Patent
Al-Araji et al.

[11] Patent Number: 6,091,441
[45] Date of Patent: Jul. 18, 2000

[54] RADIO FREQUENCY DETECTOR FOR CABLE TELEVISION DISTRIBUTION SYSTEMS

[75] Inventors: Saleh R. Al-Araji, Alpharetta; James F. Blair; Herman A. Kruse, both of Winder, all of Ga.

[73] Assignee: Scientific-Atlanta, Inc., Norcross, Ga.

[21] Appl. No.: 09/021,086

[22] Filed: Feb. 10, 1998

[51] Int. Cl.[7] ............................. H04N 17/00; H04N 5/14
[52] U.S. Cl. ........................... 348/6; 348/12; 348/192; 348/707; 455/3.1; 455/5.1; 455/67.4
[58] Field of Search ........................ 348/6, 12, 192, 348/193, 707; 455/3.1, 5.1, 6.1, 67.1, 67.3, 115, 226.2, 226.4, 67.4, 14; 330/124 R, 124 D

[56] References Cited

U.S. PATENT DOCUMENTS

| | | | |
|---|---|---|---|
| 4,591,940 | 5/1986 | Sun et al. | 361/68 |
| 4,797,735 | 1/1989 | Takai et al. | 348/192 |
| 5,077,532 | 12/1991 | Obermann et al. | 330/151 |
| 5,208,854 | 5/1993 | West, Jr. | 380/7 |
| 5,546,050 | 8/1996 | Florian et al. | 330/282 |
| 5,629,653 | 5/1997 | Stimson | 333/17.3 |
| 5,678,198 | 10/1997 | Lemson | 455/67.1 |
| 5,712,592 | 1/1998 | Stimson et al. | 330/124 R |
| 5,729,174 | 3/1998 | Dunnebacke et al. | 330/124 R |
| 5,774,016 | 6/1998 | Ketterer | 330/124 R |
| 5,861,776 | 1/1999 | Swanson | 330/124 R |
| 5,867,206 | 2/1999 | Voght et al. | 455/3.1 |
| 5,920,596 | 7/1999 | Pan et al. | 330/136 |

*Primary Examiner*—Wendy Garber
*Assistant Examiner*—Kieu-Oanh Bui
*Attorney, Agent, or Firm*—Kelly A. Gardner; Kenneth M. Massaroni; Hubert J. Barnhardt III

[57] ABSTRACT

A distribution amplifier (210) for a cable television system (100) includes an output gain stage section (215) for receiving an input signal from a cable head end section (105). The output gain stage section (215) includes multiple active amplifier circuits (225, 230) for amplifying the input signal to generate main and auxiliary outputs that are processed by a radio frequency (RF) detector (255) having at least a first detector circuit (300) for processing the main output to generate a first voltage and a second detector circuit (305) for processing the auxiliary output to generate a second voltage. Further included in the distribution amplifier (210) is a status monitor (260) coupled to the RF detector (255) for converting the first and second outputs to first and second digital values and transmitting the first and second digital values. In this manner, an indication of a system or amplifier malfunction can be provided. Other advantages of the RF detector (255) are that the main and auxiliary outputs can be either simultaneously or sequentially processed, as desired, to provide multiple indications of system problems and that the RF stages of the detector circuits (300,305) are connected in series to reduce current drain, thereby reducing power consumption. Additionally, the RF detector (255) includes a differential amplifier stage (325) that compensates for temperature variations introduced by the diode etector stage (320) to provide a thermally stable RF detector (255).

16 Claims, 4 Drawing Sheets

RADIO FREQUENCY DETECTOR FOR CABLE TELEVISION DISTRIBUTION SYSTEMS

FIELD OF THE INVENTION

This invention relates generally to cable television systems, and more specifically to distribution amplifiers used in such systems.

BACKGROUND OF THE INVENTION

Cable television systems typically route television signals to subscriber premises over a variety of different communication media, such as fiber optic cables and coaxial cables. FIG. 1 illustrates a conventional cable television system 100, which includes a head end section 105 that receives satellite signals and demodulates the signals to baseband. The baseband signal is then transmitted over a communication medium after conversion to an optical signal or a radio frequency (RF) signal. Because the signal can be transmitted for relatively long distances, one or more distribution amplifiers 110 are provided for boosting the signal. Taps 120, 125, 130 are situated along the communication media to tap off signals to subscriber premises 135.

As shown in FIG. 1, a distribution amplifier 110 can have multiple outputs, as may be better understood by referring to FIG. 2, which is a block diagram of a conventional distribution amplifier 110. The amplifier 110 typically includes an RF input 140 that couples the signal to an output gain stage section 142 comprising one or more active amplifier circuits 144, 146, 148 for outputting a main output signal and one or more auxiliary output signals. The main output signal is provided to an automatic gain control (AGC) circuit 156 for modifying the input 140 to regulate the gain of the output gain stage section 142 in a conventional manner. The main output signal and the auxiliary output signals, e.g., aux1 and aux2, are provided at outputs 162, 164, 166 and routed to taps, such as taps 120, 125, 130, and other devices, such as other active amplifiers, within the cable system 100.

Distribution systems often include a large number of devices, each of which can include a large amount of circuitry, and the devices are usually located remotely from the head end section of the cable system. Therefore, failure of system devices and components, such as components within an amplifier, can go undetected, resulting in unacceptable signal levels or interrupted service at the subscriber premises. Some typical amplifiers include a status monitoring transponder to attempt to rectify this problem. However, conventional status monitors only monitor the voltage level of the AGC pilot carrier circuit, and the AGC circuit is coupled only to the main output.

Consequently, problems in active amplifier sections that provide auxiliary outputs are not detected.

Thus, what is needed is a better way to monitor the status of a devices and stages included in a cable television system.

DETAILED DESCRIPTION OF A PREFERRED EMBODIMENT

As mentioned briefly in the Background of the Invention, cable television systems typically include a head end section for receiving a satellite signal, converting the satellite signal to a radio frequency (RF) or optical signal, and transmitting the converted signal through the system over various communication media, such as fiber optic cables or coaxial cables. When optical signals are transmitted, optical nodes within the cable television system convert such signals to RF signals for further processing by cable equipment. For instance, distribution amplifiers are used to amplify the RF signals so that signal levels do not drop below certain minimum levels. After amplification, cable taps split off signals to subscribers of the cable television system.

Typically, a distribution amplifier, which can include a large number of components and complex circuitry, is located far from the cable head end section. Therefore, improper functioning of the amplifier, or even of stages and devices that process the signal before it reaches the distribution amplifier, may not be immediately apparent to the system operator. However, system or amplifier malfunctions can result in unacceptable signal levels or interrupted service at the subscriber premises. According to the present invention, errors and malfunctions within the cable system, e.g., the amplifier or previous stages and paths, can be reliably detected so that repair can be undertaken immediately.

Figure 1:
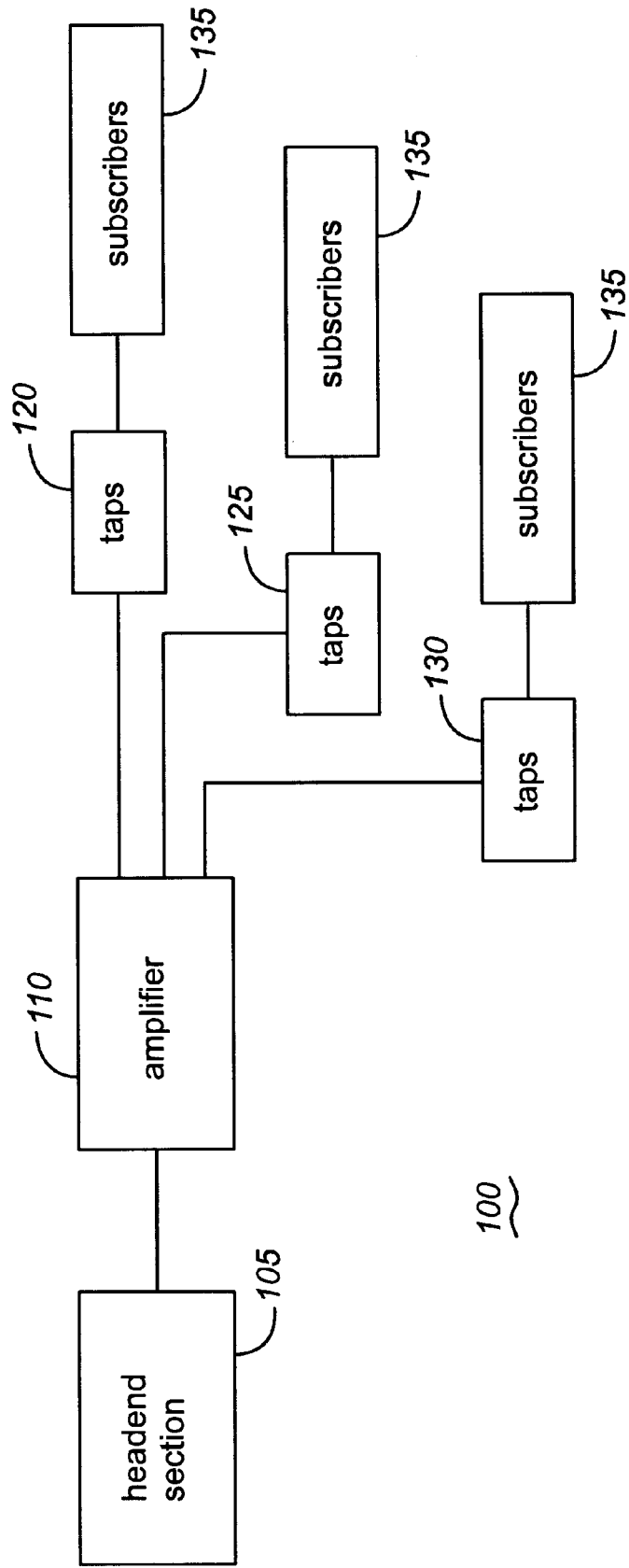
FIG. 1 is a block diagram of a conventional cable television system.
Figure 2:
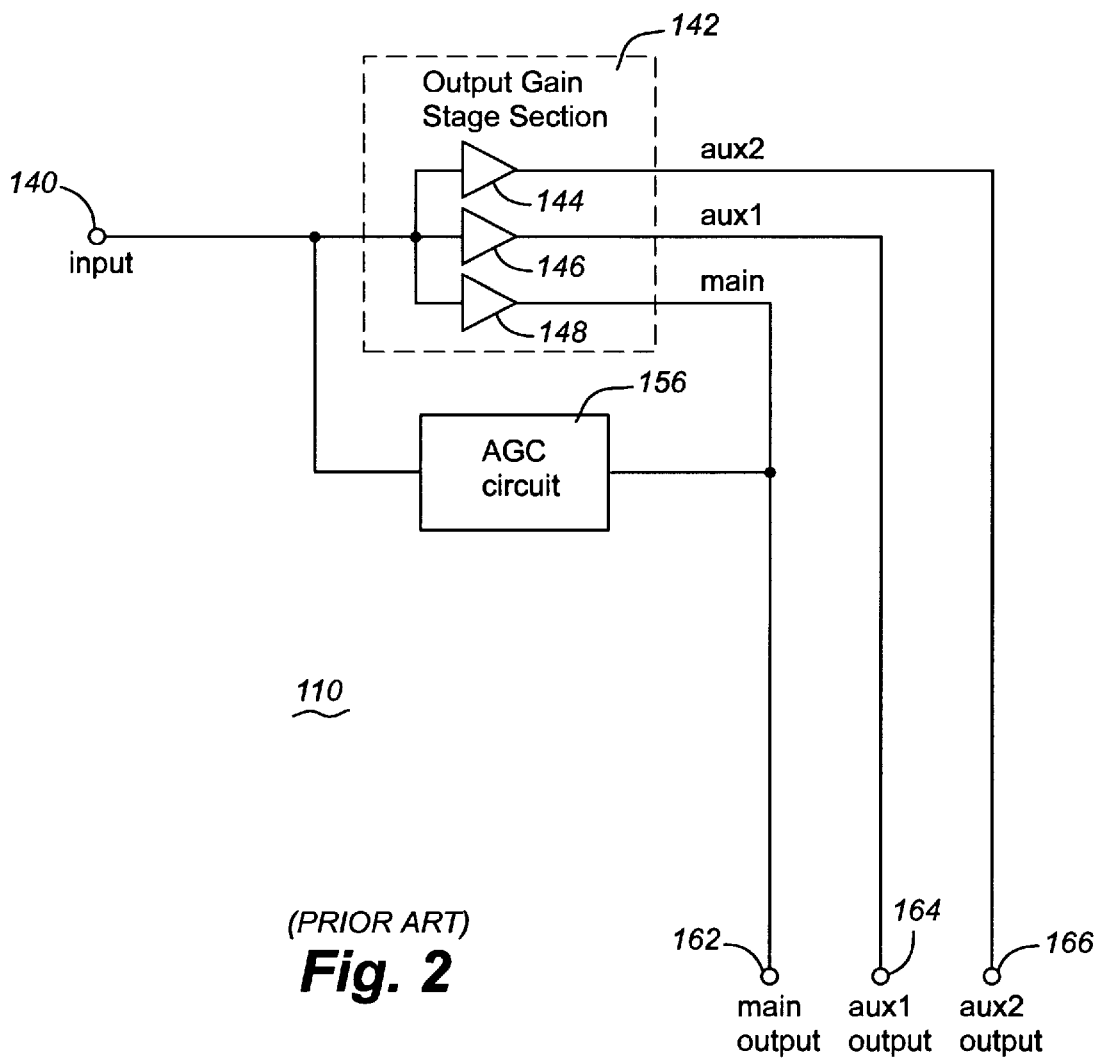
FIG. 2 is a block diagram of a conventional distribution amplifier included in the cable television system of FIG. 1.
Figure 3:
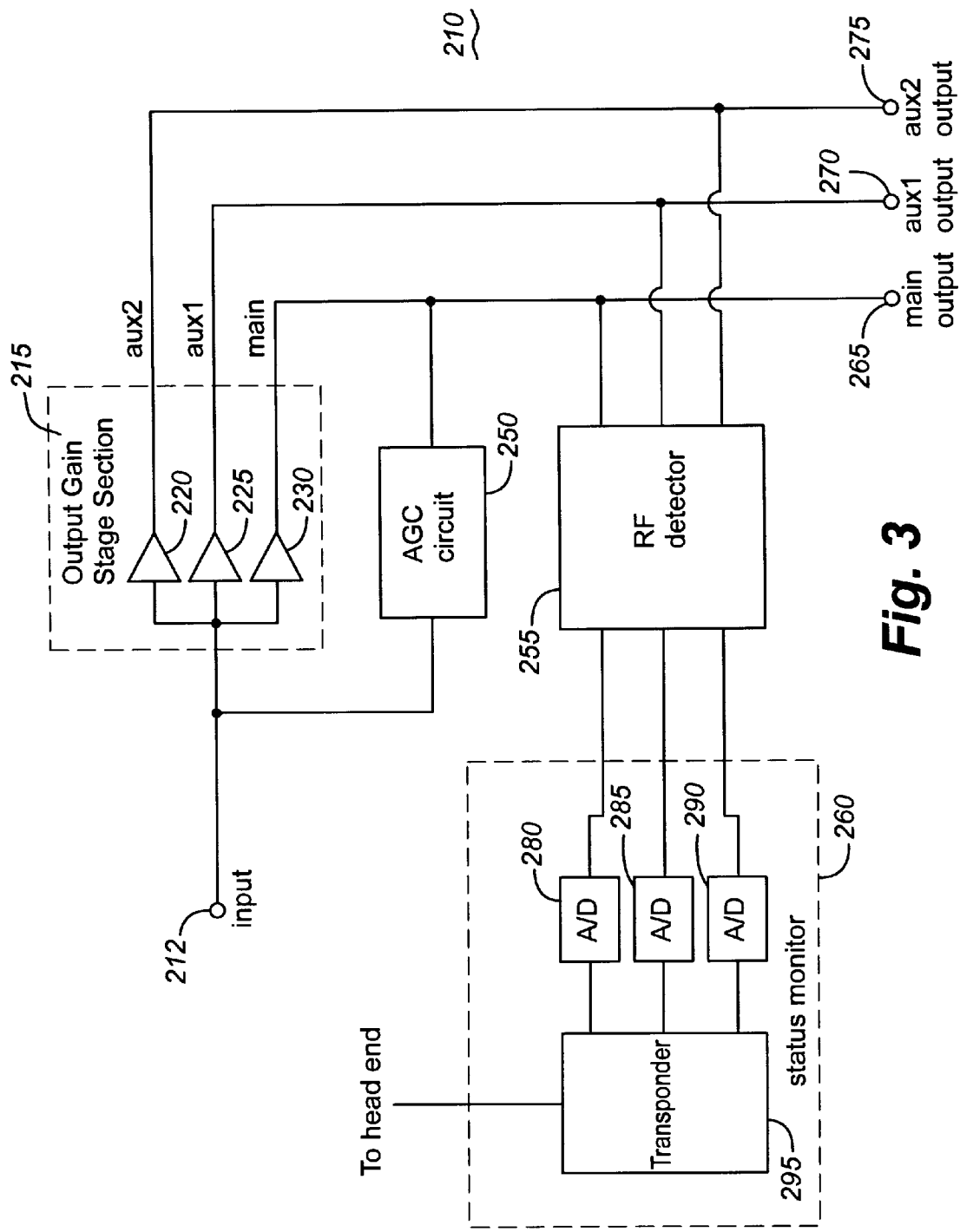
FIG. 3 is a block diagram of a distribution amplifier that can be included in a cable television system in accordance with the present invention.

Referring to FIG. 3, a block diagram of a distribution amplifier 210 for use within a cable television system, such as system 100, is shown. The distribution amplifier 210 includes an input terminal 212 for receiving a cable signal as the input signal from the head end section. At this stage in the cable television system, the signal has been converted, if necessary, from an optical signal to an RF signal. The input signal is provided to an output gain stage section 215 that includes at least one active amplifier circuit 230 for amplifying the input signal and generated a main output signal. Preferably, three active amplifier circuits 225, 230, 235 are provided for generating amplified main and auxiliary outputs. It will be appreciated, however, that any number of active amplifier circuits can be provided within practical limits. For instance, when the cable television system is small, perhaps only first and second active amplifier circuits will be required, whereas a much larger system might be equipped with numerous distribution amplifiers, each having a great number of active amplifier circuits. In the amplifier 210 of FIG. 3, the amplified signals are shown as "main", "aux 1", and "aux2", all of which are provided as amplifier outputs that are subsequently routed to other devices, such as taps and amplifiers, within the cable system. More specifically, the main output signal is provided at a main output terminal 265, the first auxiliary output signal is provided at an aux1 output terminal 270, and the second auxiliary output signal is provided at an aux2 output terminal 275. Additionally, the main output signal is coupled to an automatic gain control (AGC) circuit 250 for providing feedback at the input of the output gain stage section 215 in a conventional manner.

The main and auxiliary output signals are also provided to an RF detector 255 that can conveniently process a composite signal comprising multiple carriers. More specifically, the RF detector 255 processes all of the amplified signals to provide voltage outputs corresponding thereto. When main, aux1, and aux2 output signals are coupled into the RF detector 255, first, second, and third output voltages are generated and provided to a status monitor 260 included within the distribution amplifier 210. The output voltages are generally in the form of direct current (DC) voltages ranging approximately from zero to five volts. As shown, the output voltages are provided on three different dedicated outputs. However, it will be appreciated that a single output could be provided, and the single output could be coupled to circuitry for periodically sampling the three outputs associated, respectively, with the main, aux1, and aux2 signals and providing the samples to the status monitor 260.

The status monitor 260 preferably includes an analog-to-digital (A/D) converter 280, 285, 290 for each input from the RF detector 255, although it will be appreciated that only a single A/D converter would be required in the situation in which a single output is provided from the RF detector 255. Each A/D converter 280, 285, 290 converts the received analog voltage into a digital value that is preferably provided to an transponder 295 for transmission to the head end section of the cable television system. The head end section receives the digital values corresponding to the active amplifier circuits 220, 225, 230 and processes the digital values to determine whether any of the amplifier circuits 220, 225, 230 or any previous stages of cable equipment are functioning improperly. The digital values could, for instance, be provided to a head end processor for comparison with stored threshold values below or above which a determination is made that a malfunction has occurred. Preferably, an error is determined to have occurred when a digital value is indicative of a signal level outside the range of 3.0V +/−0.25V at 16 dBmV. Thereafter, service personnel could be immediately provided with status information from the distribution amplifier 210 for tracing the malfunction to that amplifier 210 or to previous stages (as indicated by status information provided by previous amplifiers). As a result, service problems for subscribers can be conveniently minimized or even eliminated.

It will be appreciated that the digital values can be provided to the head end section by a variety of methods without departing from the scope of the present invention. For instance, a landline and reverse amplifier can be used to route the digital values. Alternatively, the transponder 295 could comprise an RF transmitter for providing a radio signal including the digital values. Furthermore, the status monitor 260 itself could, in some embodiments, provide the analysis necessary to determine whether an error has occurred, in which case the digital values need not be transmitted to the head end section at all. This could be done by providing a simple comparator to determine whether a digital value has strayed outside the window of values indicative of proper signal levels and circuitry for providing an alarm signal, such as a high voltage, to the head end section only when a malfunction is indicated.

Figure 4:
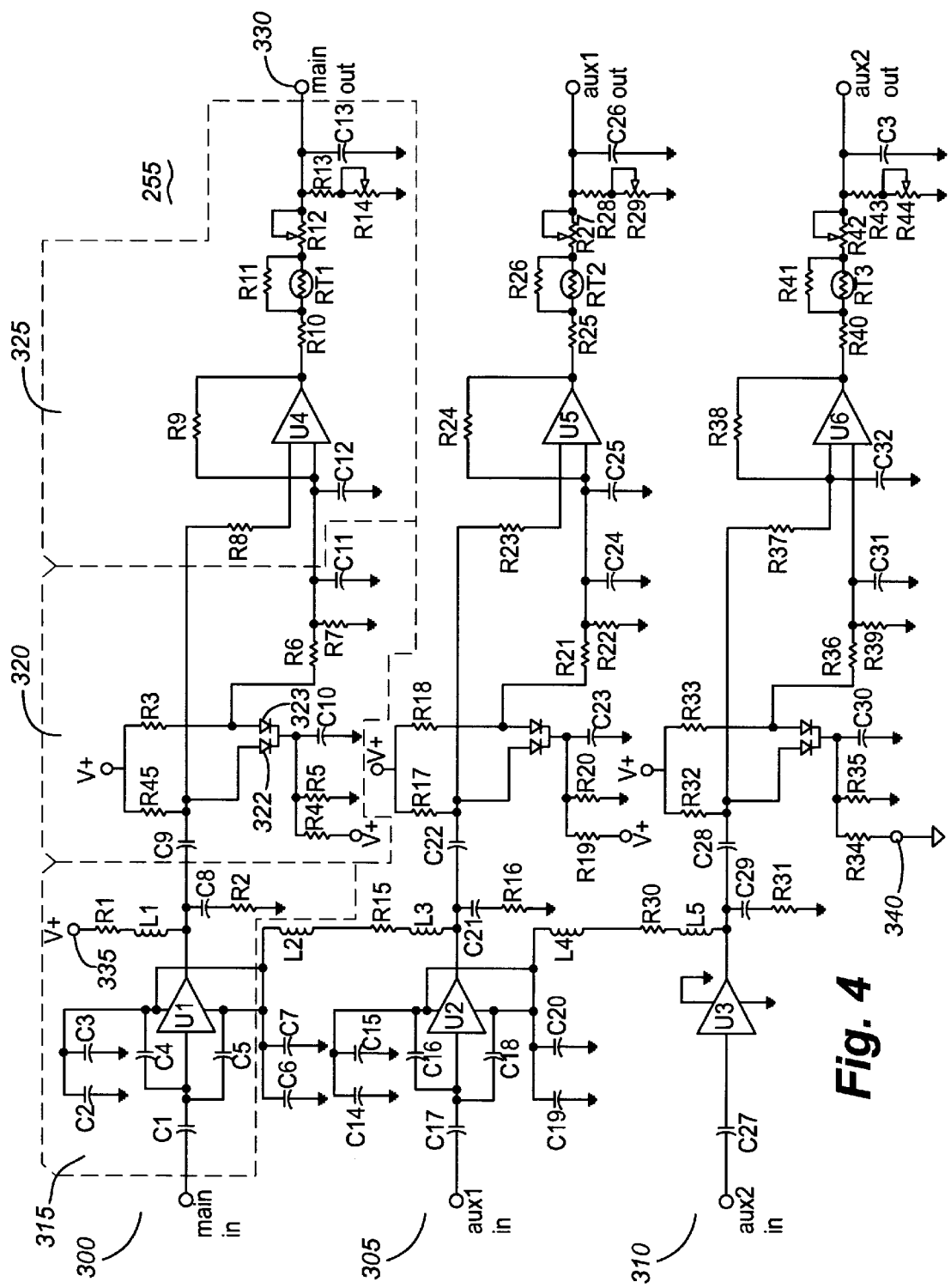
FIG. 4 is an electrical circuit diagram of a radio frequency detector included within the distribution amplifier of FIG. 3 in accordance with the present invention.

FIG. 4 is an electrical circuit diagram of the RF detector 255, which, in this example, includes three detector circuits 300, 305, 310 for processing the three input signals, i.e., main, aux1, and aux2. The detector circuits 300, 305, 310 each include similar stages and components; therefore, for purposes of convenience, a detailed description is provided only with respect to detector circuit 300. The detector circuit 300 generally includes an amplifier stage 315, a diode detector stage 320, and a differential amplifier stage 325. The amplifier stage 315 amplifies the received RF signal, e.g., main, aux1, or aux2, and the diode detector stage 320 tracks the amplified signal to generate voltage values. It should be noted that the Schottky diodes 322, 323 are very sensitive to temperature. The diode 322 that receives the RF signal is associated with a thermal drift, and the differential amplifier stage 325 compensates for the effect of temperature on the diode detector stage 320. The output 330 of the detector circuit 300 is therefore able to reliably indicate amplifier status by providing a temperature-compensated DC voltage. This is very important since the RF detector 255 processes DC, rather than AC, and, as a result, any variation due to temperature would be extremely noticeable.

It will be appreciated that exact component placement and values will vary according to the design of the above-mentioned stages. However, examples of values that can be used are provided in the below table.

TABLE 1

Examples of values for RF detector

| Refernce | Part value |
| --- | --- |
| U1–U3 | ERA3SM manufactured by Minicircuit |
| U4–U6 | MC33274 manufactured by Motorola, Inc. |
| L1–L5 | 5.6 µH |
| C1–C3, C6–C10, C14, C15, C17, C19–C23, C27–C30 | 100 pF |
| C4, C5, C16, C18 | 1 pF |
| C11, C12, C24, C25, C31, C32 | 0.01 µF |
| C13, C24, C33 | 0.01 µF |
| RT1–RT3 | 5 kΩ |
| R1, R15, R30 | 110 Ω |
| R2, R16, R31 | 75 Ω |
| R45, R3, R17, R18, R32, R33 | 392 kΩ |
| R4, R19, R34 | 22.6 kΩ |
| R5, R20, R35 | 1.21 kΩ |
| R6, R8, R12, R14, R21, R23, R27, R29, R36, R37, R42, R44 | 10 kΩ |
| R7, R9, R22, R24, R35, R39 | 160 kΩ |
| R10, R11, R13, R25, R26, R28, R40, R41, R43 | 5.1 kΩ |

As mentioned, multiple detector circuits 300, 305, 310 can be provided. Amplifiers within the RF sections of the detector circuits generally require on the order of forty milliamps (40 mA) to function in a stable manner. Therefore, if the DC supply bias lines of multiple detector circuits were coupled in parallel, the current drain would quickly rise to an impractical level. The RF detector 255 according to the present invention conveniently eliminates this problem by DC coupling the detector circuits 300, 305, 310 in series. More specifically, the RF amplifier stage 315 of the detector circuit 300 is coupled to a positive voltage terminal 335 for receiving V+, which can be on the order of +24 volts (V), and the amplifier stage of the second detector circuit 305 is DC coupled in series with the first detector circuit 300. The amplifier stage of the third detector circuit 310 is then DC coupled in series with the second detector circuit 305 and connected to a ground voltage terminal 340 for receiving a ground voltage. The amplifier stages of the first and second detector circuits 300, 305 are not DC grounded, thereby reducing current drain and power consumption. As a result, current on the order of 40 mA flows between the positive voltage terminal 335 and the ground voltage terminal 340 through the RF sections of the first, second, and third detector circuits 300, 305, 310. Compensation capacitors, i.e., C4, C5, C16, and C18, have been provided for stabilizing the RF detector 255.

An advantage of the RF detector 255 according to the present invention is that all outputs of the output gain stage section 215 can be processed simultaneously. This is preferably accomplished by providing a detector circuit 300, 305, 315 for each signal from the output gain stage section 215. However, according to an alternate embodiment of the present invention, all signals provided by the output gain stage section 215 could be processed sequentially by a single detector circuit. In this situation, a switch, timer, and controller (not shown) could be provided. Inputs of the switch could be respectively coupled to the outputs of the output gain stage section 215, and a single output of the switch could be coupled to the input of the RF detector having the single detector circuit. The switch could be activated by the controller, based on timer references, to couple the outputs of the output gain stage section 215, one at a time, to the RF detector input, thereby allowing the RF detector to sample the various outputs of the output gain stage section 215. In this manner, complexity and expense of the RF detector could be reduced while still monitoring main and auxiliary outputs.

In summary, the cable television system as described above includes a distribution amplifier having multiple active amplifier circuits for producing multiple output signals that are routed throughout the cable system. According to the present invention, the output of each active amplifier circuit is processed by an RF detector for providing outputs indicative of statuses of the amplifier circuits. More specifically, the RF detector has a DC output corresponding to each amplified input, and DC levels below certain predetermined values are indicative of a malfunction in the corresponding amplifier circuit.

The voltages output by the RF detector are subsequently converted to digital values by a status monitor included in the distribution amplifier. The status monitor can provide the digital values back to the cable head end section for a determination thereby of possible erroneous system operation. Alternatively, digital values could be processed in other ways. For example, the status monitor could send an alarm message back to the head end section only when an error has been detected, such as when the value moves outside a predefined window of operation, or a display device on the distribution amplifier could locally display the value to a service technician. In this manner, possible problems can be detected without delay, and a malfunctioning amplifier or other malfunctioning equipment can be repaired quickly.

It will be appreciated by now that there has been provided an improved method of monitoring the status of distribution equipment included in a cable television system.

What is claimed is:

1. A distribution amplifier, comprising:
    an output gain state section for amplifying an input signal to provide at least first and second outputs, wherein the output gain stage section includes at least first and second active amplifier circuits for providing, respectively, the first and second outputs; and
    a radio frequency (RF) detector for processing the first and second outputs to provide first and second voltages indicative of status of the output gain stage section; wherein the status of the output gain stage section is indicated without use of any pilot signal; and wherein the RF detector comprises at least first and second detector circuits that are DC coupled in series between a positive voltage terminal and a ground voltage terminal, the first detector circuit processing the first output to provide the first voltage indicative of the status of the first active amplifier circuit, and the second detector circuit processing the second output to provide the second voltage indicative of the status of the second active amplifier circuit.

2. The distribution amplifier of claim 1, further comprising:
    a status monitor coupled to the RF detector for receiving the first and second voltages and providing status indications thereof.

3. The distribution amplifier of claim 2, wherein the status monitor comprises:
    circuitry for converting the first and second voltages to first and second digital values, respectively; and
    a transponder coupled to the circuitry for transmitting the first and second digital values to a device for processing the first and second digital values to determine whether either of the first and second active amplifier circuits of the distribution amplifier is providing an unacceptable RF output level.

4. The distribution amplifier of claim 3, wherein the first voltage provided by the first detector circuit comprises a direct current (DC) voltage corresponding to an RF level of the first output from the first active amplifier circuit.

5. The distribution amplifier of claim 4, wherein the status monitor comprises an analog-to-digital (A/D) converter for sampling the DC voltage to provide digital values that track changes in the RF level of the first output from the first active amplifier circuit.

6. The distribution amplifier of claim 5, wherein the status indications provided by the status monitor can indicate that the RF level is unacceptably low or that the RF level is unacceptably high.

7. A distribution amplifier, comprising:
    an output gain stage section for receiving an input signal, the output gain stage section including at least a first active amplifier circuit for amplifying the input signal to generate a first output and a second active amplifier circuit for amplifying the input signal to generate a second output;
    a radio frequency (RF) detector, including at least a first detector circuit for processing the first output to generate a first voltage and a second detector circuit for processing the second output to generate a second voltage, wherein the at least first and second detector circuits are DC coupled in series between a positive voltage terminal and a ground voltage terminal; and
    a status monitor coupled to the RF detector for converting the first and second outputs to first and second digital values and transmitting the first and second digital values.

8. The distribution amplifier of claim 7, wherein the first and second voltages are generated without use of any pilot signal.

9. The distribution amplifier of claim 8, wherein the first voltage provided by the first detector circuit comprises a DC voltage corresponding to an RF level of the first output from the first active amplifier circuit, and the second voltage provided by the second detector circuit comprises a DC voltage corresponding to an RF level of the second output from the second active amplifier circuit.

10. The distribution amplifier of claim 9, wherein the status monitor comprises:

circuitry for converting the first and second voltages to the first and second digital values; and a transponder for transmitting the first and second digital values to an external device for analysis thereof.

11. A cable television system, including:

a head end section for transmitting a cable signal over a communication medium, the cable signal comprising video and audio information;

a distribution amplifier coupled to the communication medium for amplifying the cable signal, the distribution amplifier including:

an output gain stage section for amplifying the cable signal to provide at least main and auxiliary outputs, the output gain stage section of the distribution amplifier including at least first and second active amplifier circuits for providing, respectively the main and auxiliary outputs; and a radio frequency (RF) detector coupled to the output gain stage section for processing the main and auxiliary outputs, the RF detector including at least first and second detector circuits that are DC coupled in series between a positive voltage terminal and a ground voltage terminal, the first detector circuit processing the main output to provide a first voltage that corresponds to an RF level of the main output and that indicates the status of the first active amplifier circuit, and the second detector circuit processing the auxiliary output to provide a second voltage that corresponds to an RF level of the auxiliary output and that indicates the status of the second active amplifier circuit; and taps coupled to the distribution amplifier for routing the main and auxiliary outputs to cable subscribers.

12. The cable television system of claim 11, wherein the distribution amplifier further comprises:

a status monitor coupled to the RF detector for receiving the first and second voltages and providing status indications thereof.

13. The cable television system of claim 12, wherein the status monitor comprises:

circuitry for converting the first and second voltages to first and second digital values, respectively; and a transponder coupled to the circuitry for transmitting the first and second digital values.

14. The cable television system of claim 13, wherein the first and second voltages provided, respectively, by the first and second detector circuits are generated without reference to any pilot signal.

15. The distribution amplifier of claim 1, wherein the RF detector comprises temperature compensation means such that the first and second voltages provided by the RF detector comprise temperature-compensated DC voltages.

16. The distribution amplifier of claim 15, wherein the temperature compensation means comprises a differential amplifier stage that compensates for the effect of temperature on the RF detector.

* * * * *

UNITED STATES PATENT AND TRADEMARK OFFICE
CERTIFICATE OF CORRECTION

PATENT NO : 6,091,441
DATED : JULY 18, 2000
INVENTOR(S) : AL-ARAJI ET AL.

It is certified that error appears in the above-identified patent and that said Letters Patent is hereby corrected as shown below:

Face of Patent in Abstract, delete "etector" and insert therefore -detector-
Table 1, delete "Refernce" and insert therefore -reference-
Table 1, Line 4, delete "100pF" and insert therefore -1000pF-
Table 1, Line 7, delete "C24" and insert therefore -C26-

Signed and Sealed this

First Day of May, 2001

NICHOLAS P. GODICI

Attest:

Attesting Officer    Acting Director of the United States Patent and Trademark Office